US012609079B2

(12) United States Patent
Zhang et al.

(10) Patent No.: US 12,609,079 B2
(45) Date of Patent: Apr. 21, 2026

(54) PIXEL CIRCUIT AND DISPLAY PANEL

(71) Applicant: Wuhan China Star Optoelectronics Semiconductor Display Technology Co., Ltd., Wuhan (CN)

(72) Inventors: Xiaoxia Zhang, Wuhan (CN); Chao Dai, Wuhan (CN); Zhilin Yang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/851,086

(22) PCT Filed: Jun. 28, 2023

(86) PCT No.: PCT/CN2023/103163
§ 371 (c)(1),
(2) Date: Sep. 26, 2024

(87) PCT Pub. No.: WO2024/045830
PCT Pub. Date: Mar. 7, 2024

(65) Prior Publication Data

US 2025/0218361 A1 Jul. 3, 2025

(30) Foreign Application Priority Data

Aug. 30, 2022 (CN) ......................... 202211058743.5

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0852* (2013.01); *G09G 2300/0861* (2013.01); *G09G 2320/0247* (2013.01)

(58) Field of Classification Search
CPC ...... G09G 3/3233; G09G 3/32; G09G 3/3266; G09G 3/3208; G09G 3/3225;
(Continued)

(56) References Cited

U.S. PATENT DOCUMENTS 11,049,454 B1 6/2021 Lu
2016/0343278 A1 11/2016 Tsujita
(Continued)

FOREIGN PATENT DOCUMENTS

CN 110033734 A 7/2019
CN 113035133 A 6/2021
(Continued)

OTHER PUBLICATIONS

International Search Report in International application No. PCT/CN2023/103163, mailed on Sep. 15, 2023.
(Continued)

*Primary Examiner* — Dong Hui Liang
(74) *Attorney, Agent, or Firm* — Nathan & Associates Patent Agents Ltd.; Menachem Nathan

(57) ABSTRACT

A pixel circuit and a display panel. The pixel circuit includes a driving transistor, a write-in transistor, a first light emission control transistor, a second light emission control transistor, and a first initialization transistor. By initializing a potential of a source or a drain of the driving transistor at least once before and after a charging phase of a frame, the potential of the source or the drain of the driving transistor may be stabilized.

18 Claims, 10 Drawing Sheets

(58) Field of Classification Search

CPC ...... G09G 3/3258; G09G 3/3275; G09G 3/20; G09G 3/3291; G09G 2300/0861; G09G 2300/0842; G09G 2300/0819; G09G 2300/0852; G09G 2300/0426; G09G 2310/08; G09G 2310/0251; G09G 2310/061; G09G 2310/0262; G09G 2310/0286; G09G 2320/0247; G09G 2320/0233; G09G 2320/045; G09G 2320/0257; G09G 2320/043; G09G 2330/021; G09G 2340/0435

See application file for complete search history.

(56) References Cited

U.S. PATENT DOCUMENTS

| | | | | |
|---|---|---|---|---|
| 2022/0148506 | A1* | 5/2022 | Yuan | G09G 3/3233 |
| 2023/0237965 | A1* | 7/2023 | Lin | H10K 59/1213<br>345/691 |

FOREIGN PATENT DOCUMENTS

| | | | |
|---|---|---|---|
| CN | 113140179 | A | 7/2021 |
| CN | 113140180 | A | 7/2021 |
| CN | 113261106 | A | 8/2021 |
| CN | 113707080 | A | 11/2021 |
| CN | 113724651 | A | 11/2021 |
| CN | 113950715 | A | 1/2022 |
| CN | 114120910 | A | 3/2022 |
| CN | 114758618 | A | 7/2022 |
| CN | 115410523 | A | 11/2022 |
| KR | 20210084097 | A | 7/2021 |

OTHER PUBLICATIONS

Written Opinion of the International Search Authority in International application No. PCT/CN2023/103163, mailed on Sep. 15, 2023.

Chinese Office Action issued in corresponding Chinese Patent Application No. 202211058743.5 dated Feb. 17, 2025, pp. 1-9.

* cited by examiner

PIXEL CIRCUIT AND DISPLAY PANEL

CROSS REFERENCE TO RELATED APPLICATIONS

This application is a US national phase application based upon an International Application No. PCT/CN2023/103163, filed on Jun. 28, 2023, which claims priority to Chinese Patent Application No. 202211058743.5, filed on Aug. 30, 2022, the contents of which are incorporated herein by reference in their entireties.

TECHNICAL FIELD

The present disclosure relates to the field of display technologies, and more particularly, to a pixel circuit and a display panel.

BACKGROUND

During the operation of the pixel circuit, it may be necessary to switch from high-frequency driving to low-frequency driving, that is, the frequency of one or more signals is reduced from high frequencies such as 120 Hz or 60 Hz to low frequencies such as 10 Hz or 1 Hz. However, after such a frequency switch, the data signal is not re-written, meaning that the gate potential of the driving transistor remains unchanged. Meanwhile, the potential at the source and/or drain of the driving transistor undergoes periodic changes. This can easily lead to changes in brightness and cause flickering when switching to low-frequency driving.

SUMMARY

Technical Problem

The present disclosure provides a pixel circuit and a display panel to alleviate a technical problem that a potential of a source and/or a drain of a driving transistor may be periodically changed when switching to low-frequency driving.

Technical Solution

According to a first aspect, the present disclosure provides a pixel circuit including: a driving transistor; a write-in transistor, one of a source or a drain of the write-in transistor being electrically connected to the driving transistor, another of the source or the drain of the write-in transistor being electrically connected to a data line, and a gate of the write-in transistor being connected to a first control line; a first light emission control transistor, one of a source or a drain of the first light emission control transistor being electrically connected to one of a source or a drain of the driving transistor, another of the source or the drain of the first light emission control transistor being electrically connected to a positive power supply line, and a gate of the first light emission control transistor being electrically connected to a first light emission control line; a second light emission control transistor, one of a source or a drain of the second light emission control transistor being electrically connected to another of the source or the drain of the driving transistor, another of the source or the drain of the second light emission control transistor being electrically connected to a negative power supply line, and a gate of the second light emission control transistor being electrically connected to the first light emission control line or a second light emission control line; and a first initialization transistor, one of a source or a drain of the first initialization transistor being electrically connected to the source or the drain of the driving transistor, another of the source or the drain of the first initialization transistor being electrically connected to a first initialization line, and a gate of the first initialization transistor being electrically connected to a second control line and configured to respectively initializing a potential of the source or the drain of the driving transistor at least once before and after a charging phase of a frame.

In some implementations, under a condition that the first initialization transistor is in a conductive state, the driving transistor is in the conductive state, and the write-in transistor, the first light emission control transistor, and the second light emission control transistor are all in a cutoff state.

In some implementations, the pixel circuit further includes: a coupling capacitor, one terminal of which being electrically connected to one of the gate of the driving transistor, the source or the drain of the write-in transistor, and another terminal of which being electrically connected to the other of the source or the drain of the second light emission control transistor; and a storage capacitor, one terminal of which being electrically connected to the other terminal of the coupling capacitor, and another terminal of which being electrically connected to the positive power supply line.

In some implementations, the gate of the second light emission control transistor is electrically connected to the first light emission control line; during the charging phase, a conduction time of the write-in transistor at least partially overlaps with a conduction time of the first light emission control transistor and/or the second light emission control transistor.

In some implementations, the first control line is configured to transmit a first control signal, the second control line is configured to transmit a second control signal, and the first control signal and the second control signal each have a first pulse and a second pulse successively distributed in a frame; a waveform of the first control signal is the same as a waveform of the second control signal, and a phase of the second control signal lags behind a phase of the first control signal; within a frame, the first pulse of the second control signal is temporally located between the first pulse of the first control signal and the second pulse of the first control signal, and the second pulse of the first control signal is temporally located between the first pulse of the second control signal and the second pulse of the second control signal.

In some implementations, the data line is configured to transmit a data signal; a duration of the first pulse is less than a duration of the second pulse; within the duration of the first pulse, a potential of the data signal is less than a pulse amplitude of the data signal.

In some implementations, the pixel circuit further includes: a storage capacitor, one terminal of which being electrically connected to the gate of the driving transistor, and another end of which being electrically connected to the other of the source and the drain of the second light emission control transistor; and a first transistor, one of a source or a drain of the first transistor being electrically connected to one of the source or the drain of the driving transistor, another of the source or the drain of the first transistor being electrically connected to the gate of the driving transistor, and a gate of the first transistor being electrically connected to a third control line; where one of the source or the drain of the write-in transistor is electrically connected to another of the source or the drain of the driving transistor; under a condition that the first initialization transistor is in a conductive state, the driving transistor is in the conductive state, and the write-in transistor, the first light emission control transistor, the second light emission control transistor, and the first transistor are all in a cutoff state.

In some implementations, under a condition that the first initialization transistor is in a cutoff state, both the first transistor and the first light emission control transistor are in a conductive state, and both the write-in transistor and the second light emission control transistor are in a cutoff state.

In some implementations, the pixel circuit further includes: a light emitting device whose anode is electrically connected to the other of the source or the drain of the second light emitting control transistor, and whose cathode is connected to the negative power supply line; and a second initialization transistor, one of a source or a drain of the second initialization transistor being connected to the anode of the light emitting device, another of the source or the drain of the second initialization transistor being electrically connected to a second initialization line, and a gate of the second initialization transistor being electrically connected to a fourth control line or the third control line; where the second initialization transistor is in a conductive state a plurality of times during a non-luminous phase of a frame.

According to a second aspect, the present disclosure provides a display panel including a pixel circuit, the pixel circuit including: a driving transistor; a write-in transistor, one of a source or a drain of the write-in transistor being electrically connected to the driving transistor, another of the source or the drain of the write-in transistor being electrically connected to a data line, and a gate of the write-in transistor being connected to a first control line; a first light emission control transistor, one of a source or a drain of the first light emission control transistor being electrically connected to one of a source or a drain of the driving transistor, another of the source or the drain of the first light emission control transistor being electrically connected to a positive power supply line, and a gate of the first light emission control transistor being electrically connected to a first light emission control line; a second light emission control transistor, one of a source or a drain of the second light emission control transistor being electrically connected to another of the source or the drain of the driving transistor, another of the source or the drain of the second light emission control transistor being electrically connected to a negative power supply line, and a gate of the second light emission control transistor being electrically connected to the first light emission control line or a second light emission control line; and a first initialization transistor, one of a source or a drain of the first initialization transistor being electrically connected to the source or the drain of the driving transistor, another of the source or the drain of the first initialization transistor being electrically connected to a first initialization line, and a gate of the first initialization transistor being electrically connected to a second control line and configured to respectively initializing a potential of the source or the drain of the driving transistor at least once before and after a charging phase of a frame, where a channel type of the driving transistor is the same as a channel type of the write-in transistor, a channel type of the first light emission control transistor, a channel type of the second light emission control transistor, and a channel type of the first initialization transistor.

BENEFICIAL EFFECT

According to the pixel circuit and the display panel provided in the present disclosure, the potential of one of the source and the drain of the driving transistor may be reset before and after charging by initializing the potential of the source or the drain of the driving transistor for at least one time respectively before and after a charging phase of a frame, and the potential of the other of the source and the drain of the driving transistor may be reset by the self-action of the driving transistor, so that the potential of the source or the drain of the driving transistor may be stabilized, and even if the pixel circuit switches the driving frequency, voltages of the three terminals of the driving transistor may be maintained, thereby improving the flickering phenomenon caused by periodic changes in the potential(s) of the source and/or the drain of the driving transistor.

DETAILED DESCRIPTION

To make the objectives, technical solutions, and effects of the present disclosure clearer and more definite, the following provides a further detailed explanation of the present disclosure with reference to the accompanying drawings and embodiments. It should be understood that the specific embodiments described here are only for the purpose of explaining the present disclosure and do not limit the scope of the present disclosure.

Figure 1:
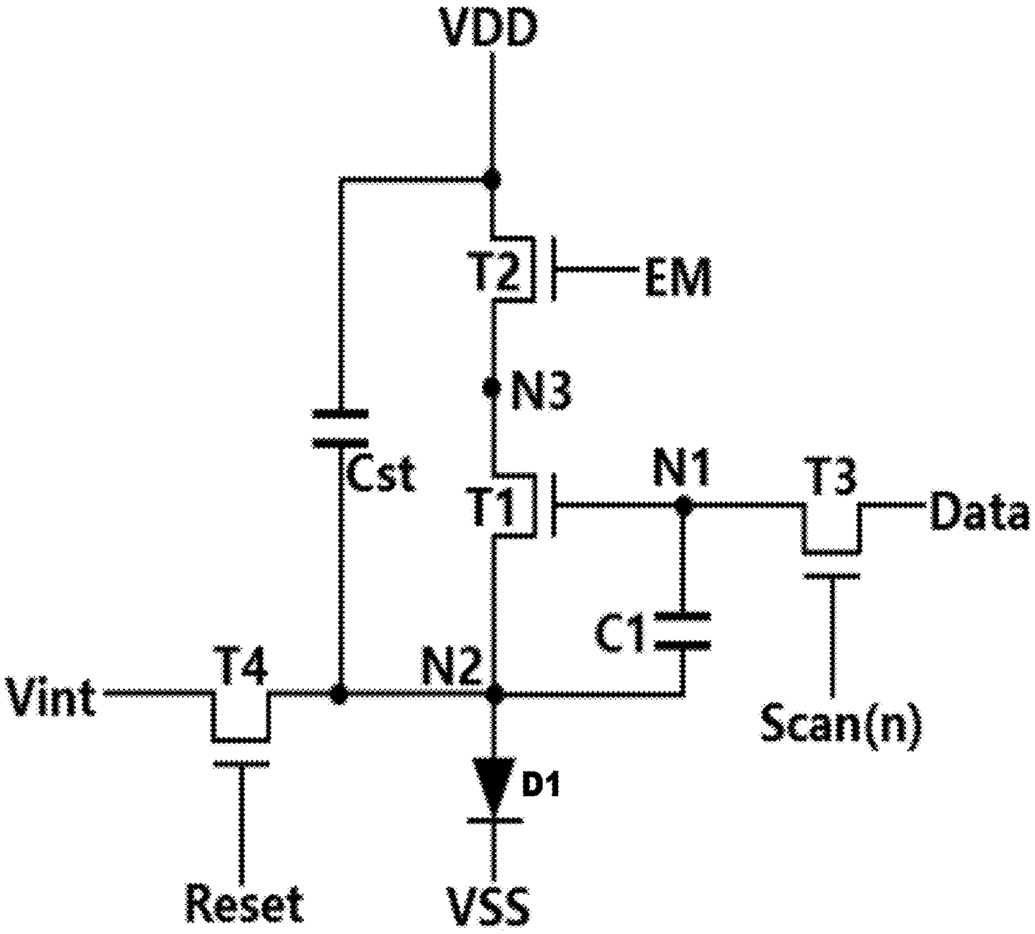
FIG. 1 is a schematic diagram of a first configuration of a pixel circuit in the related art.
Figure 2:
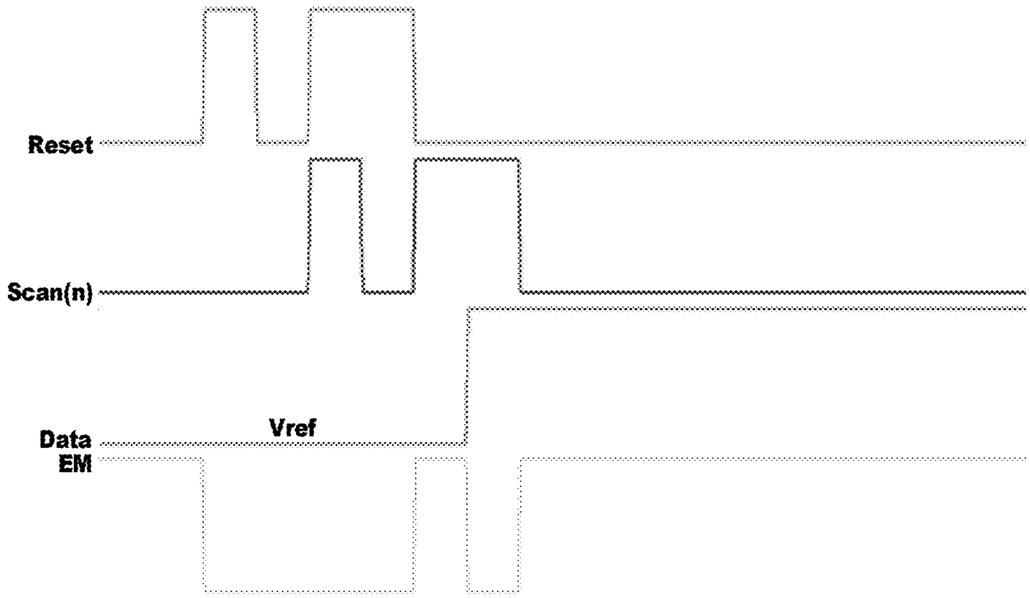
FIG. 2 is a timing diagram of the pixel circuit shown in FIG. 1.

FIG. 1 is a schematic diagram of a first configuration of a pixel circuit in the related art. The operation of the pixel circuit, as shown in FIG. 2, includes the following four phases.

- Phase One: The reset signal Reset and the scan signal Scan(n) are set high, turning on transistors T4 and T3, and the initialization signal Vint and the low potential Vref of the data signal Data are written into nodes N2 and N1, respectively. Due to the presence of coupling capacitor C1, a fixed voltage difference exists between node N1 and node N2.
- Phase Two: The reset signal Reset is set low, the potential of the scan signal Scan(n) remains unchanged, and the light emission control signal EM is set high. The voltage at node N1 remains unchanged, and node N2 is gradually charged to Vref−Vth (node N2 is continuously charged to the cutoff state, Vgs=VN1−VN2=Vth). At this time, VD1=Vref−Vth−VSS, and it is required that VD1 is less than the turn-on voltage. Here, VN1 is the potential at node N1, VN2 is the potential at node N2, VD1 is the anode potential of the light-emitting device D1, Vth is the threshold voltage of the driving transistor T1, and VSS is the potential of the negative power supply signal transmitted in the negative power supply line.

Phase Three: The reset signal Reset is set low, the potential of the scan signal Scan(n) remains unchanged, and the light emission control signal EM is set low. The potential of the data signal Data is changed from the low potential Vref to the high potential. Consequently, the voltage at node N1 is changed from the low potential Vref to the high potential of the data signal Data. Due to the action of the coupling capacitor C1, the voltage at node N2 is also coupled and pulled high, satisfying $\Delta VN2\times(C1+Cst+CD1)=\Delta VN1\times C1$. Here, C1 is the capacitance of the coupling capacitor C1, Cst is the capacitance of the storage capacitor Cst, CD1 is the equivalent capacitance of the light-emitting device D1, ΔVN1 is the amount of change in potential at node N1, and ΔVN2 is the amount of change in potential at node N2.

Phase Four: The reset signal Reset is set low, the scan signal Scan(n) is set low, and the light emission control signal EM is set high, allowing the positive power supply signal VDD transmitted in the positive power supply line to flow towards the negative power supply signal VSS. After transistor T2 is turned on, node N2 charges the capacitor of the light-emitting device to saturation, which begins to emit light.

Under a condition that the pixel circuit shown in FIGS. 1 and 2 is switched from high-frequency display to low-frequency display during operation, the frequency of the scan signal Scan(n) also needs to be switched from high frequencies such as 120 Hz or 60 Hz to low frequencies such as 10 Hz or 1 Hz. However, after such a frequency switch, the data signal Data is not re-written, meaning that the gate potential of the driving transistor T1 remains unchanged. Meanwhile, the potential(s) of the source and/or drain of the driving transistor T1 undergoes periodic changes, which may easily lead to flickering.

Figure 3:
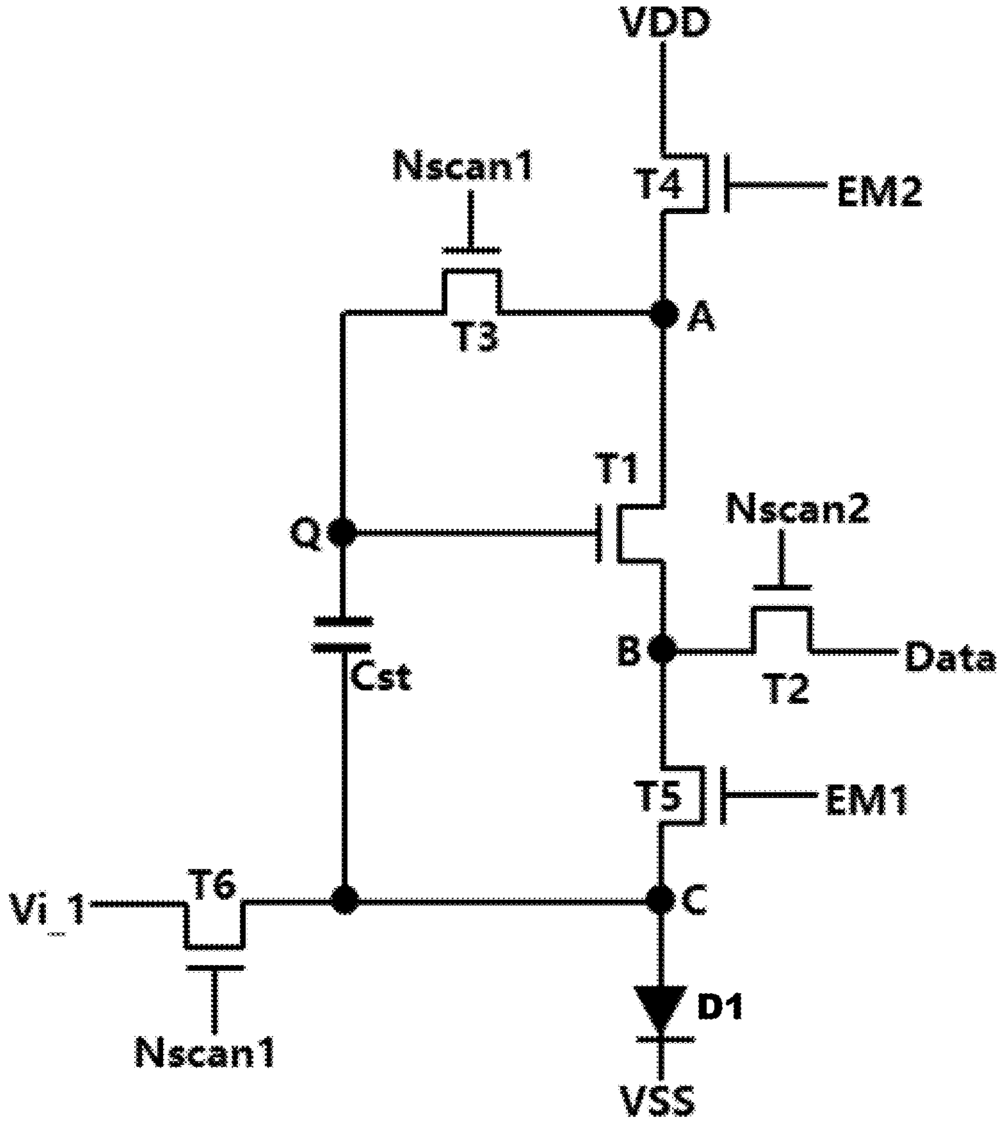
FIG. 3 is a schematic diagram of a second configuration of a pixel circuit in the related art.
Figure 4:
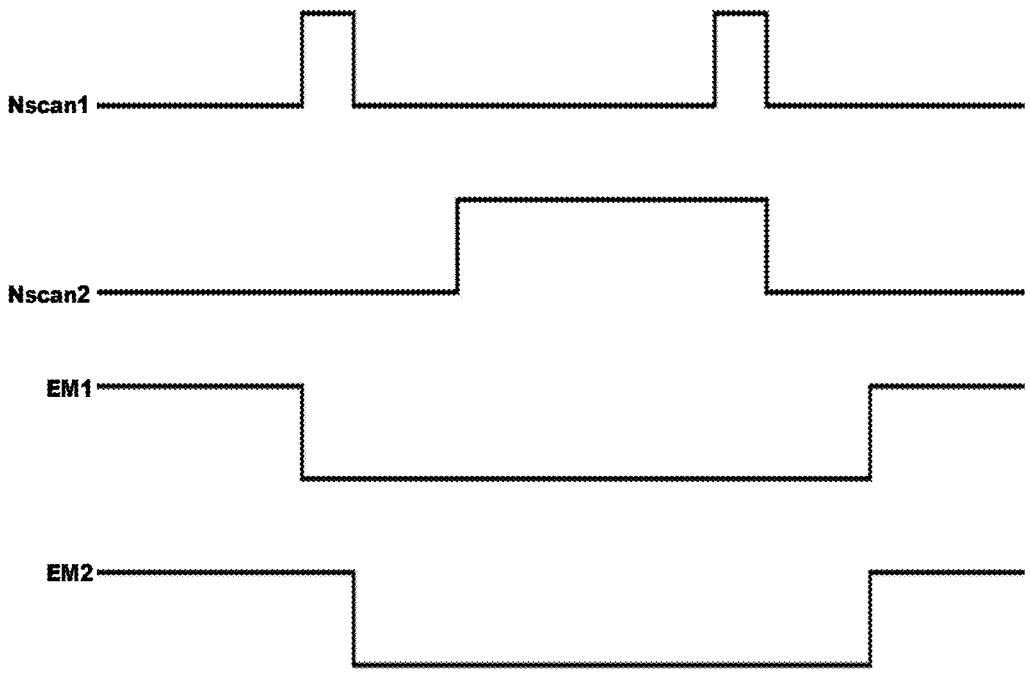
FIG. 4 is a timing diagram of the pixel circuit shown in FIG. 3.

FIG. 3 is a schematic diagram of a second configuration of a pixel circuit in the related art. The operation of the pixel circuit, as shown in FIG. 4, includes the following four phases.

Phase One: The light emission control signal EM2 and the scan signal Nscan1 are both set high, turning on transistors T4 and T6, which allows the positive power supply signal VDD and the initialization signal Vi_1 to be written to the two terminals of the storage capacitor Cst, ensuring a fixed voltage difference across the storage capacitor Cst.

Phase Two: The scan signal Nscan2 is set high while the scan signal Nscan1 is set low. At this point, the data signal Data is written to node A through transistor T2 and the driving transistor T1. However, because the scan signal Nscan1 is set low, transistor T3 cannot be turned on, meaning that the data signal Data cannot be written to node Q.

Phase Three: Both scan signals Nscan1 and Nscan2 are set high, and the data signal Data is written to node Q.

Phase Four: The light emission control signals EM1 and EM2 are both set high, and the light-emitting device D1 emits light normally.

Under a condition that the pixel circuit shown in FIGS. 3 and 4 is switched from high-frequency display to low-frequency display during operation, the frequency of the scan signal Nscan1 also needs to be switched from high frequencies such as 120 Hz or 60 Hz to low frequencies such as 10 Hz or 1 Hz. However, after such a frequency switch, the data signal Data is not re-written, meaning that the gate potential of the driving transistor T1 remains unchanged. Meanwhile, the potential(s) of the source and/or drain of the driving transistor T1 undergoes periodic changes, which may easily lead to flickering.

In light of the aforementioned technical issue that the potential(s) of the source and/or drain of the driving transistor T1 undergoes periodic changes when switching to low-frequency driving, the present embodiment provides a pixel circuit. Referring to FIGS. 5 to 10, the pixel circuit includes at least one of the driving transistor T1, the write-in transistor T2, the first light emission control transistor T4, the second light emission control transistor T5, and the first initialization transistor T7. One of the source or drain of the write-in transistor T2 is electrically connected to the driving transistor T1, the other of the source or drain of the write-in transistor T2 is electrically connected to the data line, and the gate of the write-in transistor T2 is connected to the first control line. One of the source or drain of the first light emission control transistor T4 is electrically connected to one of the source or drain of the driving transistor T1, the other of the source or drain of the first light emission control transistor T4 is electrically connected to the positive power supply line, and the gate of the first light emission control transistor T4 is electrically connected to the first light emission control line. One of the source or drain of the second light emission control transistor T5 is electrically connected to the other of the source or drain of the driving transistor T1, the other of the source or drain of the second light emission control transistor T5 is electrically connected to the negative power supply line, and the gate of the second light emission control transistor T5 is electrically connected to the first or second light emission control line. One of the source or drain of the first initialization transistor T7 is electrically connected to the source or drain of the driving transistor T1, the other of the source or drain of the first initialization transistor T7 is electrically connected to the first initialization line, and the gate of the first initialization transistor T7 is connected to the second control line. The first initialization transistor T7 is configured to initialize the potential of the source or drain of the driving transistor T1 at least once before and after the charging phase of a frame.

It may be understood that in the pixel circuit provided in the present embodiment, by initializing the potential of the source or drain of the driving transistor T1 at least once before and after the charging phase of a frame, the potential of one of the source or drain of the driving transistor T1 may be reset before and after charging. Thereby, through the self-action of the driving transistor T1, the potential of the other source or drain may also be reset. This stabilizes the potential of the source or drain of the driving transistor T1, maintains voltages of the three terminals of the driving transistor T1 even when the pixel circuit switches driving frequencies, and improves the flickering phenomenon caused by the periodic changes in the potential(s) of the source and/or drain of the driving transistor T1.

Figure 5:
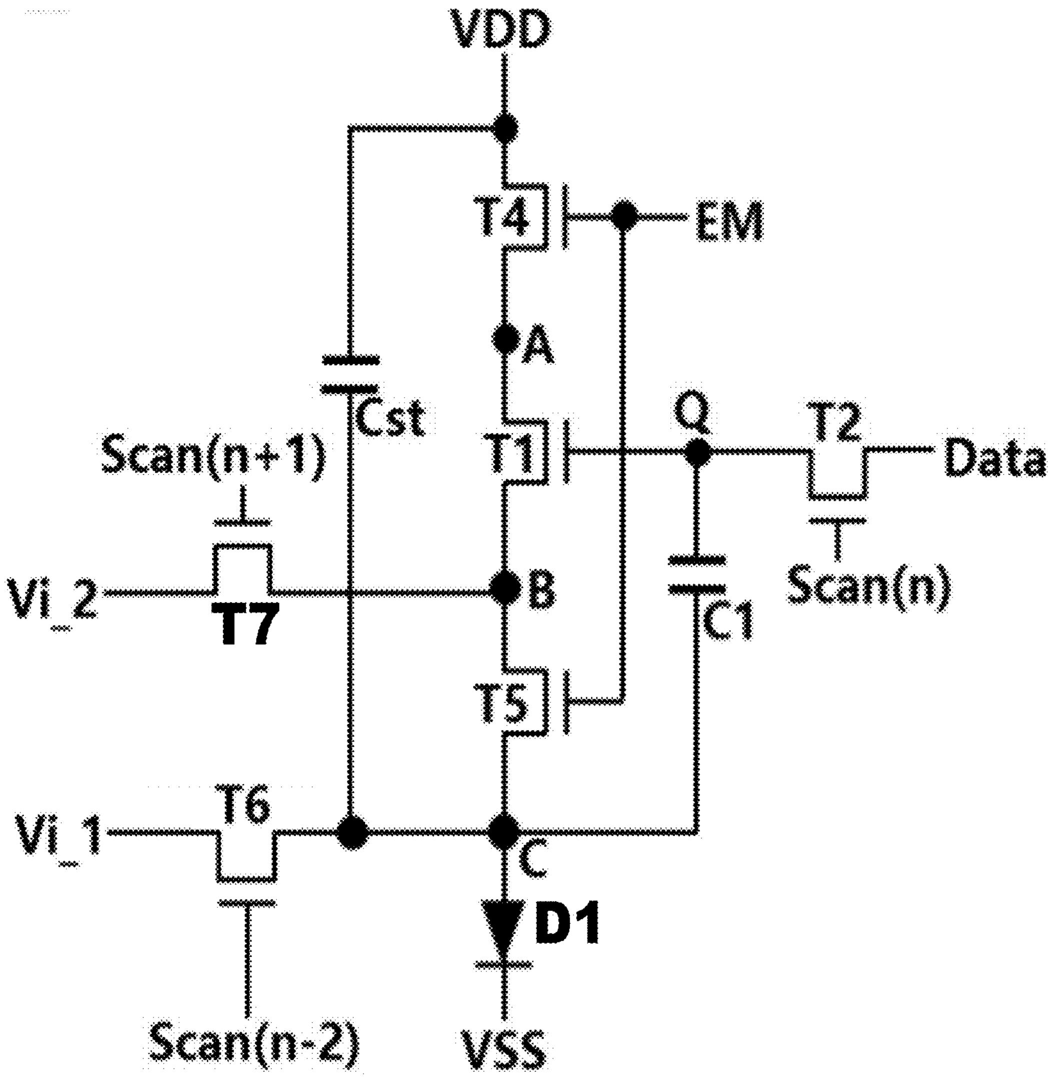
FIG. 5 is a schematic diagram of a first configuration of a pixel circuit according to an embodiment of the present disclosure.
Figure 6:
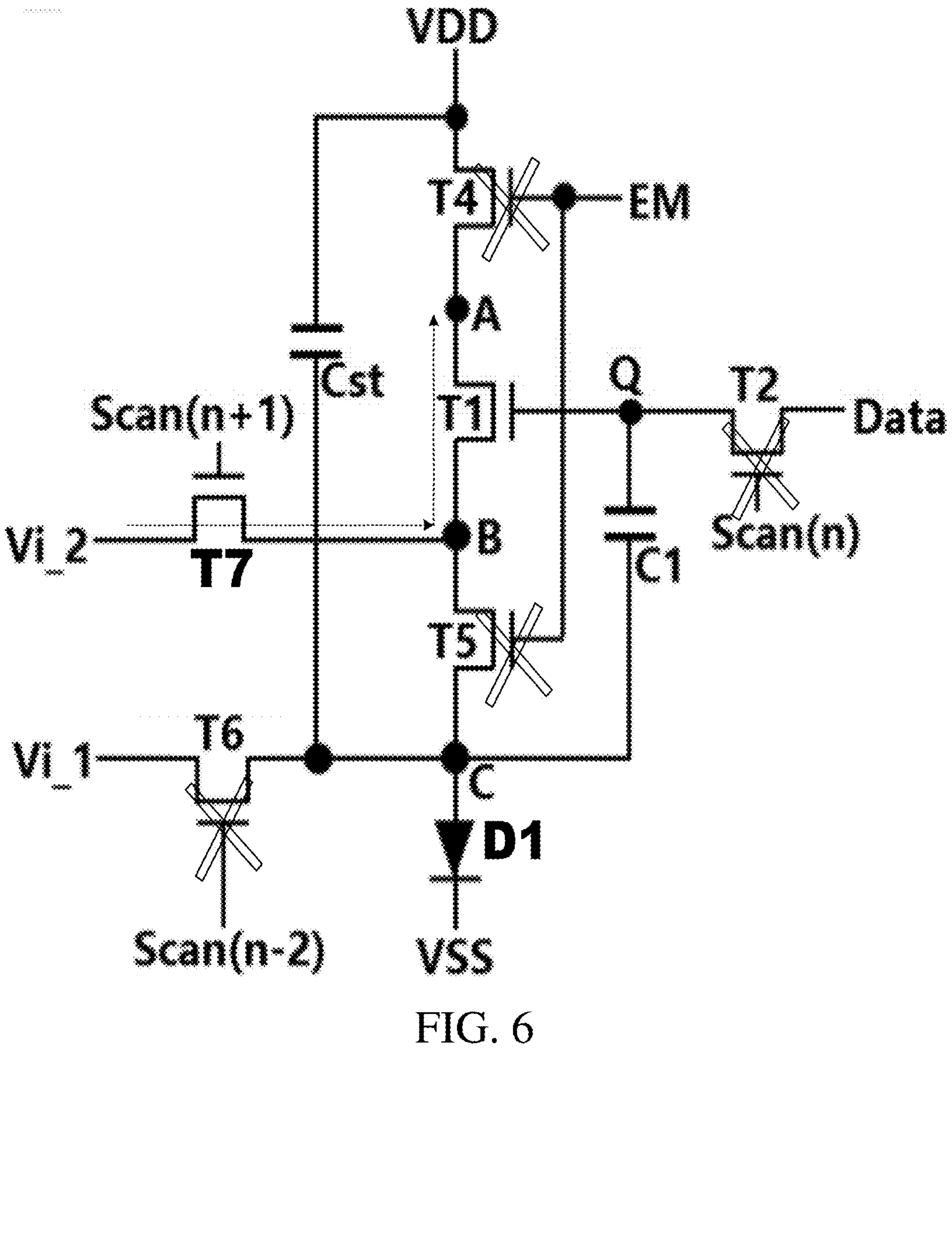
FIG. 6 is a schematic diagram of an operating state of the pixel circuit shown in FIG. 5.

In addition, as shown in FIGS. 5 and 6, the gate of the first light emission control transistor T4 and the gate of the second light emission control transistor T5 share the same first light emission control line, which may reduce the number of signal lines required by the pixel circuit, thereby facilitating an increase in the aperture ratio of the display panel.

In one embodiment, as shown in FIGS. 5 to 10, under a condition that the first initialization transistor T7 is in a conductive state, the driving transistor T1 is in a conductive state, and the write-in transistor T2, the first light emission control transistor T4, and the second light emission control transistor T5 are all in a cutoff state.

It should be noted that the write-in transistor T2, the first light emission control transistor T4, and the second light emission control transistor T5 all being in a cutoff state may prevent other signals from changing the potential(s) of the source and/or drain of the driving transistor T1 during this phase. Meanwhile, the first initialization transistor T7 and the driving transistor T1 being in a conductive state may reset the potential of one of the source or drain of the driving transistor T1 before and after charging. Thereby, through the self-action of the driving transistor T1, the potential of the other source or drain may also be reset, stabilizing the potential of the source or drain of the driving transistor T1.

In one embodiment, as shown in FIGS. 5 and 6, the pixel circuit also includes a coupling capacitor C1 and a storage capacitor Cst. One terminal of the coupling capacitor C1 is electrically connected to the gate of the driving transistor T1, to one of the source or drain of the write-in transistor T2, and the other terminal of the coupling capacitor C1 is electrically connected to the other of the source or drain of the second light emission control transistor T5. One terminal of the storage capacitor Cst is electrically connected to the other terminal of the coupling capacitor C1, and the other terminal of the storage capacitor Cst is electrically connected to the positive power supply line.

It should be noted that one of the source or drain of the write-in transistor T2 is directly electrically connected to the gate of the driving transistor T1, which may reduce the transmission path of the data signal Data to the gate of the driving transistor T1, reducing the transmission voltage drop loss of the data signal Data.

Figure 7:
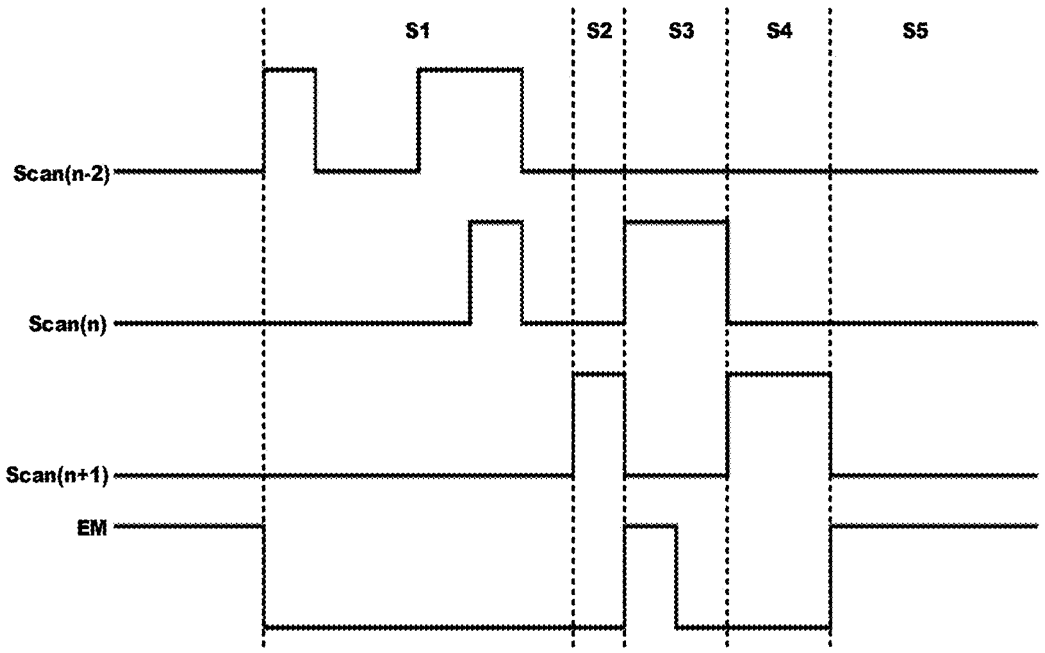
FIG. 7 is a timing diagram of the pixel circuit shown in FIG. 5.

In one embodiment, as shown in FIGS. 5 to 7, the gate of the second light emission control transistor T5 is electrically connected to the first light emission control line. During the charging phase, the conduction time of the write-in transistor T2 overlaps at least partially with the conduction time(s) of the first light emission control transistor T4 and/or the second light emission control transistor T5.

It should be noted that during the charging phase, which is the time period when pulses of the data signal Data are written into the pixel circuit, the conduction of the first light emission control transistor T4 and/or the second light emission control transistor T5 may capture the threshold voltage of the driving transistor T1 via the positive power supply signal VDD.

In one embodiment, the first control line is configured to transmit a first control signal, and the second control line is configured to transmit a second control signal. Both the first and second control signals have a first pulse and a second pulse that are successively distributed within a frame. The waveform of the first control signal is the same as that of the second control signal, and the phase of the second control signal lags behind the phase of the first control signal. Within a frame, a first pulse of the second control signal is temporally located between a first pulse and a second pulse of the first control signal, and the second pulse of the first control signal is temporally located between the first pulse and a second pulse of the second control signal.

It should be noted that the first pulse of the first control signal is configured to reset the gate potential of the driving transistor T1 using the low potential of the data signal Data, and the second pulse of the first control signal is configured to write the high potential of the data signal Data to the gate potential of the driving transistor T1, which is the charging of the pixel circuit. The first pulse of the second control signal is configured to initialize the source potential or drain potential of the driving transistor T1 before charging within a frame, and the second pulse of the second control signal is configured to initialize the source potential or drain potential of the driving transistor T1 after charging within a frame.

In one embodiment, the data line is configured to transmit the data signal Data. The duration of the first pulse is less than that of the second pulse. During the duration of the first pulse, the potential of the data signal Data is less than the pulse amplitude of the data signal Data.

It should be noted that the first pulse of the first control signal and the first pulse of the second control signal are both for resetting the potential of the corresponding node, while the duration of the second pulse of the first control signal determines the charging time. Therefore, the duration of the second pulse needs to be appropriately configured to meet the charging time requirements. The duration of the first pulse has almost no influence on the reset effect, so a shorter time may be configured for the first pulse to reduce power consumption.

Figure 8:
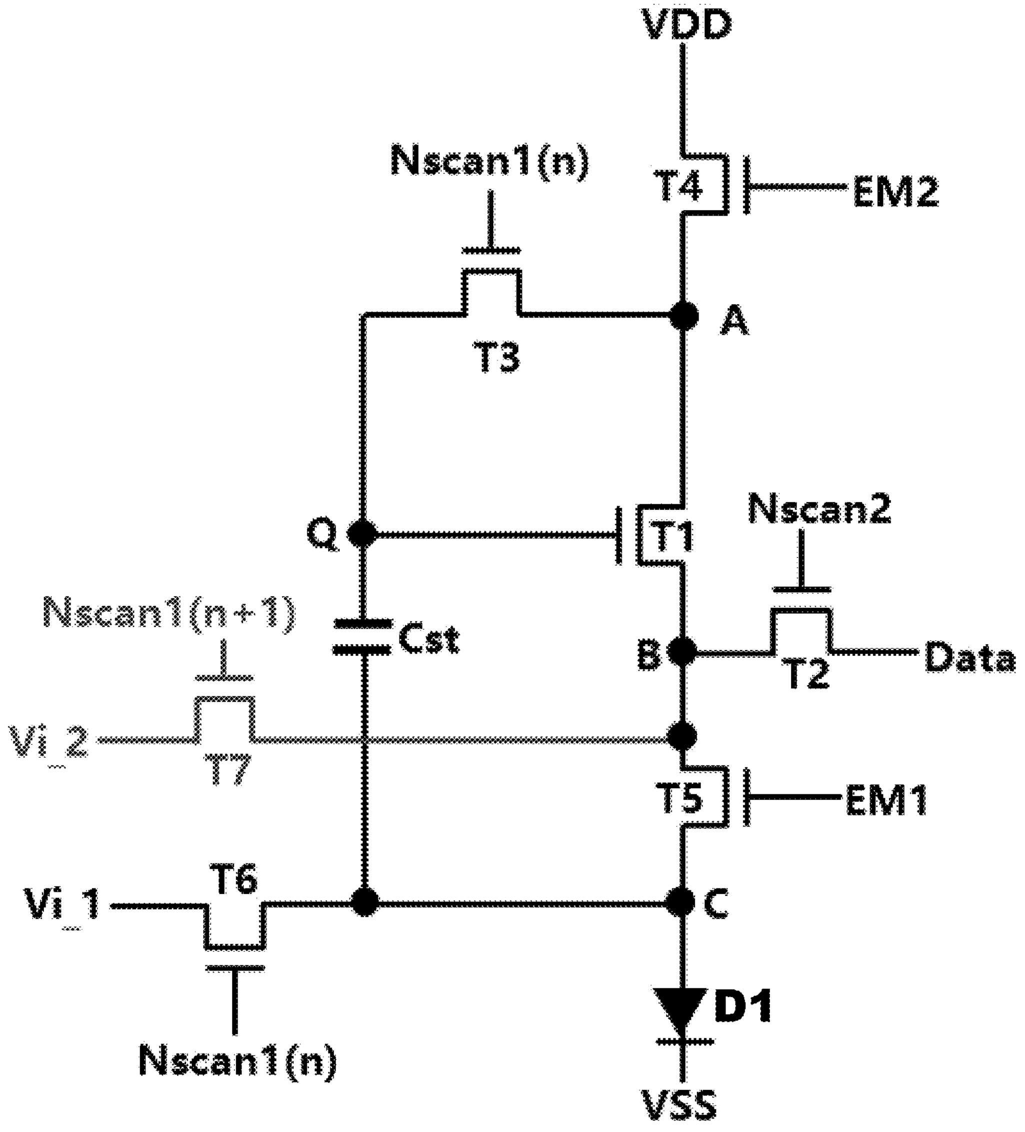
FIG. 8 is a schematic diagram of a second configuration of a pixel circuit according to an embodiment of the present disclosure.
Figure 9:
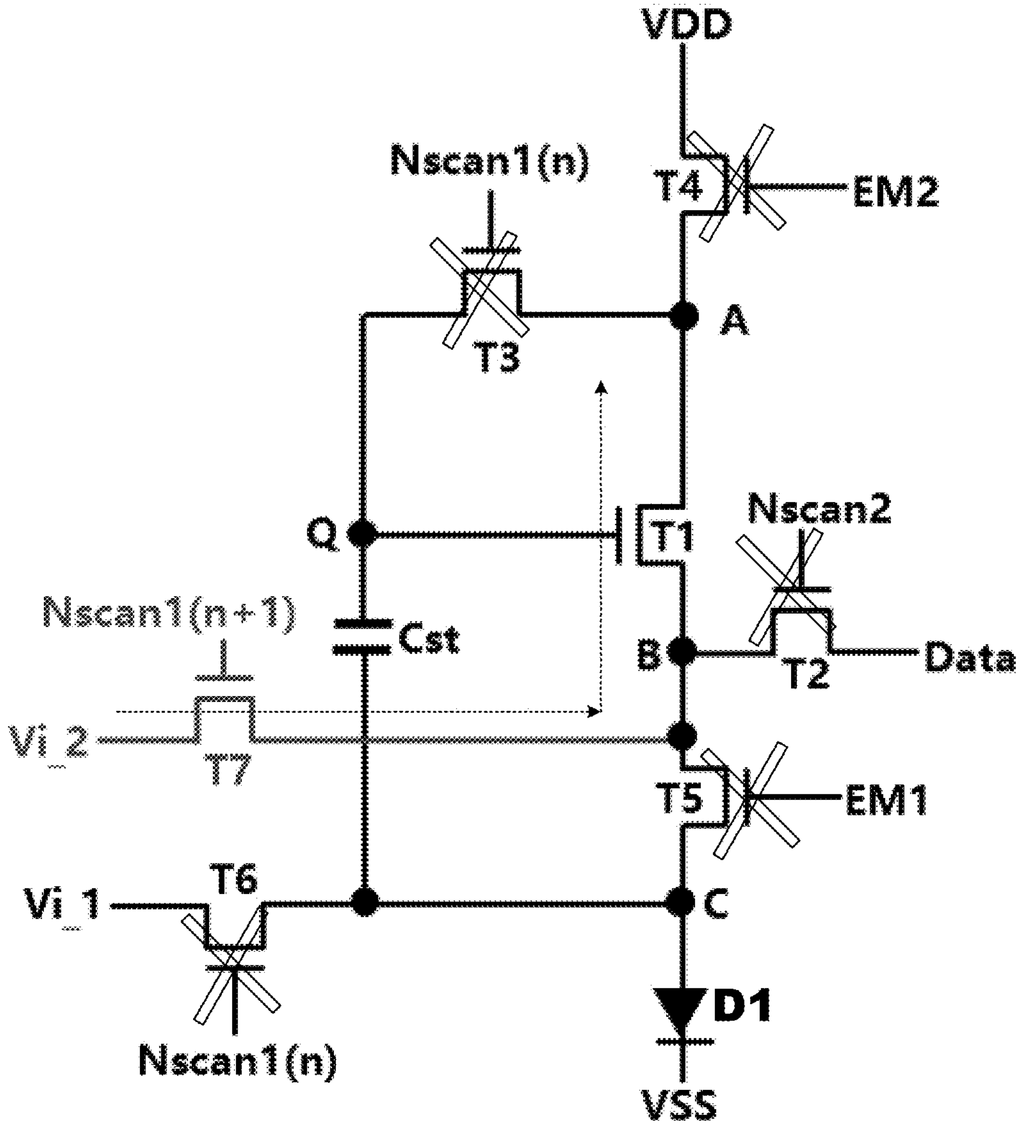
FIG. 9 is a schematic diagram of an operating state of the pixel circuit shown in FIG. 8.
Figure 10:
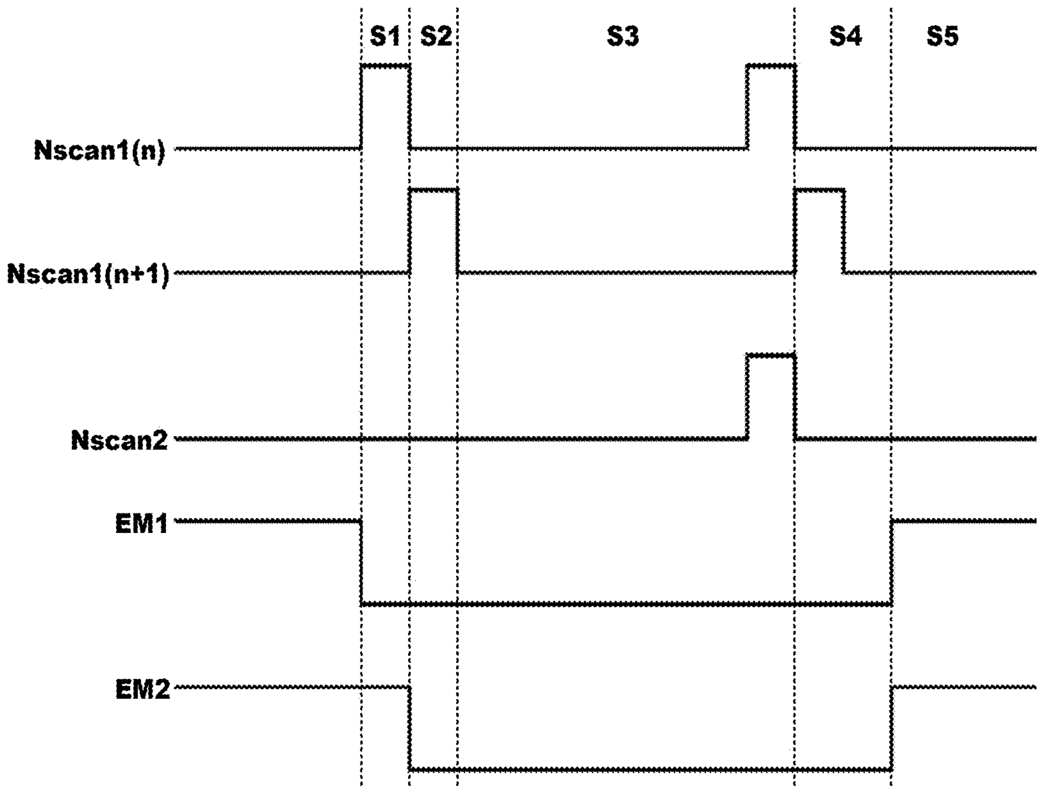
FIG. 10 is a timing diagram of the pixel circuit shown in FIG. 8.

In one embodiment, as shown in FIGS. 8 to 10, the pixel circuit also includes a storage capacitor Cst and a first transistor T3. One terminal of the storage capacitor Cst is electrically connected to the gate of the driving transistor T1, and another terminal of the storage capacitor Cst is electrically connected to the other of the source or drain of the second light emission control transistor T5. One of the source or drain of the first transistor T3 is electrically connected to one of the source or drain of the driving transistor T1, the other of the source or drain of the first transistor T3 is electrically connected to the gate of the driving transistor T1, and the gate of the first transistor T3 is electrically connected to a third control line. Here, one of the source or drain of the write-in transistor T2 is electrically connected to the other of the source or drain of the driving transistor T1. Under a condition that the first initialization transistor T7 is in a conductive state, the driving transistor T1 is in a conductive state, and the write-in transistor T2, the first light emission control transistor T4, the second light emission control transistor T5, and the first transistor T3 are all in a cutoff state.

It should be noted that the first transistor T3 may reset the anode potential of the light-emitting device D1 to accurately control the precision of the luminous intensity in each frame. The write-in transistor T2, the first light emission control transistor T4, the second light emission control transistor T5, and the first transistor T3 all being in a cutoff state may prevent other signals from changing the potential(s) of the source and/or drain of the driving transistor T1 during this phase. Meanwhile, the first initialization transistor T7 and the driving transistor T1 being in a conductive state may reset the potential of one of the source or drain of the driving transistor T1 before and after charging. Thereby, through the self-action of the driving transistor T1, the potential of the other source or drain may also be reset, stabilizing the potential of the source or drain of the driving transistor T1.

In one embodiment, under a condition that the first initialization transistor T7 is in a cutoff state, the first transistor T3 and the first light emission control transistor T4 are both in a conductive state, and the write-in transistor T2 and the second light emission control transistor T5 are both in a cutoff state.

It should be noted that in the present embodiment, the first transistor T3 may not only be configured to transmit the data signal Data to the gate of the driving transistor T1 to achieve charging of the pixel circuit but also may be configured to transmit the positive power supply signal VDD to the gate of the driving transistor T1 to reset the gate potential of the driving transistor T1.

In one embodiment, as shown in FIGS. 5 to 10, the pixel circuit also includes a light-emitting device D1 and a second initialization transistor T6. The anode of the light-emitting device D1 is electrically connected to the other of the source or drain of the second light emission control transistor T5, and the cathode of the light-emitting device D1 is connected to the negative power supply line. One of the source or drain of the second initialization transistor T6 is connected to the anode of the light-emitting device D1, the other of the source or drain of the second initialization transistor T6 is electrically connected to the second initialization line, and the gate of the second initialization transistor T6 is electrically connected to a fourth control line or the third control line. Here, the second initialization transistor T6 is in a conductive state multiple times during the non-luminous phase of a frame.

It should be noted that under a condition that the gate of the second initialization transistor T6 is electrically connected to the third control line, the second initialization transistor T6 may share the same third control line as the gate of the first transistor T3, reducing the number of signal lines required by the pixel circuit, thereby facilitating an increase in the aperture ratio of the display panel. Each conduction of the second initialization transistor T6 during the non-luminous phase of a frame may reset the source potential and/or drain potential of the driving transistor T1.

Here, the light emitting device D1 may be an organic light emitting diode, a mini light emitting diode, a micro light emitting diode, or a quantum dot light emitting diode.

In one embodiment, at least one of the channel type of the driving transistor T1, the channel type of the write-in transistor T2, the channel type of the first light emission control transistor T4, the channel type of the second light emission control transistor T5, the channel type of the first initialization transistor T7, the channel type of the first transistor T3, and the channel type of the first initialization transistor T7 may be an N-channel type or a P-channel type, in particular may also be an N-channel type metal oxide thin film transistor or a P-channel type low-temperature polysilicon thin film transistor.

Here, the positive power supply line is configured to transmit the positive power supply signal VDD and the negative power supply line is configured to transmit the negative power supply signal VSS, and the potential of the positive power supply signal VDD is higher than the potential of the negative power supply signal VSS. The data line is configured to transmit the data signal Data. The first light emission control line is configured to transmit a first light emission control signal, which may be a light emission control signal EM or a light emission control signal EM2. The second light emission control line is configured to transmit a second light emission control signal, which may be a light emission control signal EM1. The first control line is configured to transmit a first control signal, which may be a scan signal Scan(n) or a scan signal Nscan2. The second control line is configured to transmit a second control signal, which may be a scan signal Scan(n+1) or a scan signal Nscan1(*n*+1). The third control line is configured to transmit a third control signal, which may be a scan signal Nscan1(*n*). The fourth control line is configured to transmit a fourth control signal, which may be a scan signal Scan(n−2). The first initialization line is configured to transmit a first initialization signal, which may be a voltage signal Vi_2. The second initialization line is configured to transmit a second initialization signal, which may be a voltage signal Vi_1.

Here, FIG. 7 is a timing diagram of the pixel circuit shown in FIG. 5. The operation of the pixel circuit shown in FIG. 5 in a frame includes the following phases.

Phase One S1: Under a condition that the scan signal Scan(n−2) and the scan signal Scan(n) are at a high potential, the write-in transistor T2 and the second initialization transistor T6 are turned on, and the low potential of the data signal Data and the second initialization signal respectively reset nodes Q and C.

Phase Two S2: Under a condition that the scan signal Scan(n+1) is at a high potential, the first initialization transistor T7 is turned on. At this point, the driving transistor T1 is also in an on state. The first initialization signal resets one of node A or node B, and then, through the on state of the driving transistor T1 itself, the other of node A or node B may be reset in conjunction.

Phase Three S3: Under a condition that the scan signal Scan(n) is at a high potential, the write-in transistor T2 is turned on, and the high potential of the data signal Data is charged to the gate of the driving transistor T1. During this phase, the light emission control signal EM is at a high potential for at least part of the period, at which time the first light emission control transistor T4 and the second light emission control transistor T5 are both turned on, and the threshold voltage of the driving transistor T1 may be captured via the positive power supply signal VDD.

Phase Four S4: Under a condition that the scan signal Scan(n+1) is at a high potential, the first initialization transistor T7 is turned on. At this point, the driving transistor T1 is also in an on state. The first initialization signal resets one of node A or node B, and then, through the on state of the driving transistor T1 itself, the other of node A or node B may be reset in conjunction.

Phase Five S5: Under a condition that the light emission control signal EM is at a high potential, the first light emission control transistor T4 and the second light emission control transistor T5 are both turned on, and the light-emitting device D1 begins to emit light.

Here, the channel aspect ratios W/L of the second light emission control transistor T5, the first initialization transistor T7, and the second initialization transistor T6 are all the same, so that the consistency of the degree of conduction of the three transistors may be ensured. The channel length/width ratio W/L of each of the three transistors is set to be in the range of 0.5~1, so that the adequacy of conduction of the three transistors may be ensured. Here, W is the channel width and L is the channel length.

It should be noted that, compared with the pixel circuit shown in FIG. 1, the gate control signal of the second initialization transistor T6 in the pixel circuits shown in FIGS. 5 and 6 becomes the scan signal Scan(n−2), and the scan signal Scan(n−2), the scan signal Scan(n+1), and the scan signal Scan(n) each have a first pulse and a second pulse that occur successively. Here, the pulse width of the first pulse may be ½ H, the pulse width of the second pulse may be 1 H, and the interval between the first pulse and the second pulse of a same scan signal is 1 H. In terms of timing, the high-level time of the scan signal Scan(n) is entirely within the low-level period of the light emission control signal EM, except for the first pulse of the light emission control signal EM. The pulse width of the first pulse of the light emission control signal EM may be ½ H, which is aligned with the rising edge of the second pulse of the scan signal Scan(n), and at the falling edge of the second pulse of the scan signal Scan(n+1), the potential of the light emission control signal EM jumps from a low potential to a high potential. Here, H=1/(display frequency*number of pixel rows).

It will be appreciated that the reliability of the operation timing of the pixel circuit may thus be ensured without timing confusion.

FIG. 10 is a timing diagram of the pixel circuit shown in FIG. 8. The operation of the pixel circuit shown in FIG. 8 in a frame includes the following phases.

Phase One S1, the scan signal Nscan1(*n*) and the light emission control signal EM2 are at a high potential, the first light emission control transistor T4, the first transistor T3 and the second initialization transistor T6 are turned on, the positive power supply signal VDD resets the node A and the node Q, and the second initialization signal resets the node C.

Phase Two S2, the scan signal Nscan(n+1) is at a high potential, and the first initialization transistor T7 is turned on. At this point, the driving transistor T1 is also in an on state, and the first initialization signal resets one of the node A or the node B, and then, through the on state of the driving transistor T1 itself, the other of node A or node B may be reset in conjunction.

Phase Three S3, the second pulse of the scan signal Nscan(n) and the second pulse of the scan signal Nscan2 are at a high potential, the first transistor T3 and the write-in transistor T2 are turned on, and the high potential of the data signal Data is charged to the gate of the driving transistor T1.

Phase Four S4, the scan signal Nscan(n+1) is at a high potential, and the first initialization transistor T7 is turned on. At this point, the driving transistor T1 is also in an on state, and the first initialization signal resets one of the nodes A or B, and then, through the on state of the driving transistor T1 itself, the other of node A or node B may be reset in conjunction.

Phase Five S5, the light emission control signal EM1 and the light emission control signal EM2 are both at a high potential, the first light emission control transistor T4 and the second light emission control transistor T5 are both turned on, and the light-emitting device D1 begins to emit light.

Here, the channel aspect ratios W/L of the first initialization transistor T7 and the second initialization transistor T6 are the same, so that the consistency of the degree of conduction of the first initialization transistor T7 and the second initialization transistor T6 may be ensured. The channel aspect ratio W/L of both channels is set in the range of 0.5~1, so that the adequacy of the conduction of both transistors may be ensured. Here, W is the channel width and L is the channel length.

It should be noted that the scan signal Nscan1(*n*+1) has a first pulse and a second pulse that occur successively while the light emission control signals EM1 and EM2 are in a low potential state. Compared to the scan signal Nscan1(*n*), the first pulse of the scan signal Nscan1(*n*+1) is delayed by 1 H behind the first pulse of the scan signal Nscan1(*n*). The scan signal Nscan2 has pulses within a frame that are located between the first pulse and the second pulse of the scan signal Nscan1(*n*+1), which ensures that a reset may be performed on node A and/or node B before and after charging.

In one embodiment, the present embodiment provides a display panel including a pixel circuit in at least one of the above-described embodiments.

It will be appreciated that in the display panel according to the present embodiments, the potential of one of the source and the drain of the driving transistor T1 may be reset before and after charging by initializing the potential of the source and the drain of the driving transistor T1 at least once respectively before and after the charging phase of a frame, and the potential of the other of the source and the drain of the driving transistor T1 may be reset through the self-action of the driving transistor T1. As such, the potential of the source and the drain of the driving transistor T1 may be stabilized, and voltages of the three terminals of the driving transistor T1 may be maintained even if the pixel circuit switches the driving frequency, thereby improving the flickering phenomenon caused by periodic changes in the potential of the source and/or the drain of the driving transistor T1.

It will be appreciated by a person of ordinary skill in the art that equivalent substitutions or modifications may be made according to the technical solutions and inventive concepts of the present disclosure, and all such modifications or substitutions should fall within the scope of protection of the claims appended to this application.

What is claimed is:

1. A pixel circuit comprising:

a driving transistor;

a write-in transistor, one of a source or a drain of the write-in transistor being electrically connected to the driving transistor, another of the source or the drain of the write-in transistor being electrically connected to a data line, and a gate of the write-in transistor being connected to a first control line;

a first light emission control transistor, one of a source or a drain of the first light emission control transistor being electrically connected to one of a source or a drain of the driving transistor, another of the source or the drain of the first light emission control transistor being electrically connected to a positive power supply line, and a gate of the first light emission control transistor being electrically connected to a first light emission control line;

a second light emission control transistor, one of a source or a drain of the second light emission control transistor being electrically connected to another of the source or the drain of the driving transistor, another of the source or the drain of the second light emission control transistor being electrically connected to a negative power supply line, and a gate of the second light emission control transistor being electrically connected to the first light emission control line or a second light emission control line; and a first initialization transistor, one of a source or a drain of the first initialization transistor being electrically connected to the source or the drain of the driving transistor, another of the source or the drain of the first initialization transistor being electrically connected to a first initialization line, and a gate of the first initialization transistor being electrically connected to a second control line and configured to respectively initializing a potential of the source or the drain of the driving transistor at least once before and after a charging phase of a frame;

wherein the pixel circuit further comprises:

a coupling capacitor, one terminal of which being electrically connected to one of the gate of the driving transistor, the source or the drain of the write-in transistor, and another terminal of which being electrically connected to the other of the source or the drain of the second light emission control transistor; and a storage capacitor, one terminal of which being electrically connected to the other terminal of the coupling capacitor, and another terminal of which being electrically connected to the positive power supply line.

2. A display panel comprising the pixel circuit of claim 1 wherein a channel type of the driving transistor is the same as a channel type of the write-in transistor, a channel type of the first light emission control transistor, a channel type of the second light emission control transistor, and a channel type of the first initialization transistor.

3. The display panel of claim 2, wherein the gate of the second light emission control transistor is electrically connected to the first light emission control line;

during the charging phase, a conduction time of the write-in transistor at least partially overlaps with a conduction time of the first light emission control transistor and/or the second light emission control transistor.

4. The display panel of claim 3, wherein the first control line is configured to transmit a first control signal, the second control line is configured to transmit a second control signal, and the first control signal and the second control signal each have a first pulse and a second pulse successively distributed in a frame;

a waveform of the first control signal is the same as a waveform of the second control signal, and a phase of the second control signal lags behind a phase of the first control signal;

within a frame, the first pulse of the second control signal is temporally located between the first pulse of the first control signal and the second pulse of the first control signal, and the second pulse of the first control signal is temporally located between the first pulse of the second control signal and the second pulse of the second control signal.

5. The display panel of claim 4, wherein the data line is configured to transmit a data signal; a duration of the first pulse is less than a duration of the second pulse;

within the duration of the first pulse, a potential of the data signal is less than a pulse amplitude of the data signal.

6. The display panel of claim 2, wherein the pixel circuit further comprises:

a light emitting device whose anode is electrically connected to the other of the source or the drain of the second light emitting control transistor, and whose cathode is connected to the negative power supply line; and a second initialization transistor, one of a source or a drain of the second initialization transistor being connected to the anode of the light emitting device, another of the source or the drain of the second initialization transistor being electrically connected to a second initialization line, and a gate of the second initialization transistor being electrically connected to a fourth control line or the third control line;

wherein the second initialization transistor is in a conductive state a plurality of times during a non-luminous phase of a frame.

7. The display panel of claim 6, wherein a channel aspect ratio of the second light emission control transistor, the first initialization transistor, and the second initialization transistor is in a range of 0.5~1.

8. The display panel of claim 2, wherein under a condition that the first initialization transistor is in a conductive state, the driving transistor is in the conductive state, and the write-in transistor, the first light emission control transistor, and the second light emission control transistor are all in a cutoff state.

9. The display panel of claim 2, wherein at least one of the driving transistor, the write-in transistor, the first light emission control transistor, the second light emission control transistor, and the first initialization transistor is an N-channel metal oxide thin film transistor.

10. The pixel circuit of claim 1, wherein the gate of the second light emission control transistor is electrically connected to the first light emission control line;

during the charging phase, a conduction time of the write-in transistor at least partially overlaps with a conduction time of the first light emission control transistor and/or the second light emission control transistor.

11. The pixel circuit of claim 10, wherein the first control line is configured to transmit a first control signal, the second control line is configured to transmit a second control signal, and the first control signal and the second control signal each have a first pulse and a second pulse successively distributed in a frame;

a waveform of the first control signal is the same as a waveform of the second control signal, and a phase of the second control signal lags behind a phase of the first control signal;

within a frame, the first pulse of the second control signal is temporally located between the first pulse of the first control signal and the second pulse of the first control signal, and the second pulse of the first control signal is temporally located between the first pulse of the second control signal and the second pulse of the second control signal.

12. The pixel circuit of claim 11, wherein the data line is configured to transmit a data signal; a duration of the first pulse is less than a duration of the second pulse;

within the duration of the first pulse, a potential of the data signal is less than a pulse amplitude of the data signal.

13. The pixel circuit of claim 1, wherein under a condition that the first initialization transistor is in a conductive state, the driving transistor is in the conductive state, and the write-in transistor, the first light emission control transistor, and the second light emission control transistor are all in a cutoff state.

14. The pixel circuit of claim 1, wherein the pixel circuit further comprises:

a light emitting device whose anode is electrically connected to the other of the source or the drain of the second light emitting control transistor, and whose cathode is connected to the negative power supply line; and a second initialization transistor, one of a source or a drain of the second initialization transistor being connected to the anode of the light emitting device, another of the source or the drain of the second initialization transistor being electrically connected to a second initialization line, and a gate of the second initialization transistor being electrically connected to a fourth control line or the third control line;

wherein the second initialization transistor is in a conductive state a plurality of times during a non-luminous phase of a frame.

15. A pixel circuit comprising:

a driving transistor;

a write-in transistor, one of a source or a drain of the write-in transistor being electrically connected to the driving transistor, another of the source or the drain of the write-in transistor being electrically connected to a data line, and a gate of the write-in transistor being connected to a first control line;

a first light emission control transistor, one of a source or a drain of the first light emission control transistor being electrically connected to one of a source or a drain of the driving transistor, another of the source or the drain of the first light emission control transistor being electrically connected to a positive power supply line, and a gate of the first light emission control transistor being electrically connected to a first light emission control line;

a second light emission control transistor, one of a source or a drain of the second light emission control transistor being electrically connected to another of the source or the drain of the driving transistor, another of the source or the drain of the second light emission control transistor being electrically connected to a negative power supply line, and a gate of the second light emission control transistor being electrically connected to the first light emission control line or a second light emission control line; and a first initialization transistor, one of a source or a drain of the first initialization transistor being electrically connected to the source or the drain of the driving transistor, another of the source or the drain of the first initialization transistor being electrically connected to a first initialization line, and a gate of the first initialization transistor being electrically connected to a second control line and configured to respectively initializing a potential of the source or the drain of the driving transistor at least once before and after a charging phase of a frame;

wherein the pixel circuit further comprises:

a storage capacitor, one terminal of which being electrically connected to the gate of the driving transistor, and another end of which being electrically connected to the other of the source and the drain of the second light emission control transistor; and a first transistor, one of a source or a drain of the first transistor being electrically connected to one of the source or the drain of the driving transistor, another of the source or the drain of the first transistor being electrically connected to the gate of the driving transistor, and a gate of the first transistor being electrically connected to a third control line;

wherein one of the source or the drain of the write-in transistor is electrically connected to another of the source or the drain of the driving transistor; under a condition that the first initialization transistor is in a conductive state, the driving transistor is in the conductive state, and the write-in transistor, the first light emission control transistor, the second light emission control transistor, and the first transistor are all in a cutoff state.

16. A display panel comprising the pixel circuit of claim 15, wherein a channel type of the driving transistor is the same as a channel type of the write-in transistor, a channel type of the first light emission control transistor, a channel type of the second light emission control transistor, and a channel type of the first initialization transistor.

17. The display panel of claim 16, wherein under a condition that the first initialization transistor is in a cutoff state, both the first transistor and the first light emission control transistor are in a conductive state, and both the write-in transistor and the second light emission control transistor are in a cutoff state.

18. The pixel circuit of claim 15, wherein under a condition that the first initialization transistor is in a cutoff state, both the first transistor and the first light emission control transistor are in a conductive state, and both the write-in transistor and the second light emission control transistor are in a cutoff state.

* * * * *